UNITED STATES PATENT OFFICE.

LAWRENCE V. REDMAN, OF EVANSTON, AND ARCHIE J. WEITH AND FRANK P. BROCK, OF CHICAGO, ILLINOIS, ASSIGNORS TO REDMANOL CHEMICAL PRODUCTS COMPANY, OF CHICAGO, ILLINOIS, A CORPORATION OF WEST VIRGINIA.

ART OF PREPARING AND HANDLING PHENOLIC-CONDENSATION-PRODUCT VARNISH.

1,261,615.   Specification of Letters Patent.   Patented Apr. 2, 1918.

No Drawing.   Application filed May 8, 1917.   Serial No. 167,314.

*To all whom it may concern:*

Be it known that we, LAWRENCE V. REDMAN, a citizen of Canada, residing at Evanston, in the county of Cook and State of Illinois, ARCHIE J. WEITH and FRANK P. BROCK, citizens of the United States, residing at Chicago, in the county of Cook and State of Illinois, have invented a new and useful Improvement in the Art of Preparing and Handling Phenolic-Condensation-Product Varnish, of which the following is a specification.

This invention relates to the manufacture, preservation and application of phenolic condensation product, varnishes, lacquers, fluid binders, impregnating substances, etc.; and the primary object is to prevent deterioration by aging and provide a method which will insure uniformity of viscosity in the solution at the time when it is applied, or used. A further object is to secure an improved final product when the solution is used, and to avoid the loss incident to a premature passing of the materials to the final or insoluble state. In this connection, it may be explained that phenolic resin varnishes, as ordinarily placed upon the market, are in themselves potentially re-active to a final infusible stage, which results in a gradual thickening, and an increase in viscosity, and finally a solidification, rendering the varnish either totally useless or highly undesirable for use in manufacture.

The increase in viscosity of potentially re-active phenolic varnishes, or the like, renders the substances difficult of application, prevents satisfactory impregnation, where impregnation is desirable, and renders the resulting product either useless or very much inferior to the product which may be obtained when the viscosity of the varnish is low and uniform. For illustration, with a varnish of high fluidity, it is possible to obtain a good penetration into layers of paper, cotton, felt, asbestos, duck; and uniformity of viscosity insures uniformity of penetration. The same remarks hold true when the varnish is to be applied to wood surfaces or any other fibrous surface; and, in any case, a desirable evenness of application can be obtained when the varnish or lacquer is of sufficient fluidity. Furthermore, a very desirable finish is obtained when the hardening process, due to a re-action of the materials in the potentially re-active varnish, occurs to a very considerable extent after the varnish has been applied or is *in situ.*

The preferred method of practising the invention herein disclosed is as follows:

Preparatorily manufacture a soluble and fusible resin or condensation product of a phenolic body and an active methylene body containing such excess of the phenolic body as to be incapable in itself of passing to the final insoluble or infusible state; dissolve such condensation product in a suitable solvent, or solvents, such as alcohol, alcohol and water, alcohol and benzol amylacetate and water, etc.; place the same in a container, which is preferably sealed; provide or preparatorily manufacture a solution of an active methylene body, such as hexamethylenetetramin, or a solution of formaldehyde, or a mixture of hexamethylenetetramin and formaldehyde dissolved in alcohol and water, or other suitable solvent or solvents; place the solution of the methylene body, which is to be used as a hardener, in a separate container; maintain the preparatorily formed substances in the separate containers until the varnish or solution is to be used for impregnating, coating, or the like, and then adding the hardener to the solution of fusible resin, stirring the two solutions until they are thoroughly homogeneous, then applying the potentially reactive varnish or solution to any desired industial purpose.

As an example of a suitable phenolic resin, which is not in itself reactive, and which may be termed an initial stable phenolic condensation product varnish, and an example of the hardener which may be mixed therewith at such time as it is desired to put the varnish to some industrial purpose, the following may be given:

*Initial stable phenolic condensation product varnish.*

60 pounds—10 to 1 phenolic resin,
40 pounds alcohol.

*Active methylene hardener.*

19 pounds hexamethylenetetramin,
30½ pounds alcohol,
30½ pounds water.

The solutions resulting from the above mixtures are of quite high fluidity, or of low viscosity. They are manufactured and placed in separate containers, preferably in sealed containers; and in this condition they may be shipped any place, and may stand for any length of time, regardless of climate or temperature, without danger of the initial varnish thickening or passing to a final insoluble state. When it is desired to apply the varnish to some industrial purpose, such as coating the surface of any object, impregnating materials, or the like, the solutions are mixed together, and stirred until thoroughly homogeneous, and the resulting potentially reactive varnish is ready for application to the purpose in hand.

The solutions resulting from the mixtures stated above may be used in the proportions of 1 pound of the methylene hardener to 4 pounds of the initial stable phenolic condensation product varnish. The resulting solution consists of a varnish which is 50 per cent. solvent and 50 per cent. of potentially reactive resin. The above formulæ can be varied within wide limits.

When the varnish is to be used as a lacquer, the solutions are thinned in such a way, by the addition of solvents, that the resulting lacquer contains about 20 per cent. of the potentially reactive phenolic condensation product. For most purposes, a varnish consisting of 50 per cent. resin is too thick for coating, and variable amounts of solvent or mixture of solvents are added. Among the solvents suited for this purpose may be mentioned acetone, alcohol, wood alcohol, grain alcohol, benzol, naphthalene, amyl-alcohol, a solution of 50 per cent. water and 50 per cent. alcohol, creosote oil and amylacetate. Other solvents might be mentioned, but these are sufficient for illustration. A mixture of 25% amylacetate and 75% alcohol is an example of a double solvent. The initial varnish, that is the stable phenolic condensation product solution, may be kept for years in a sealed vessel without any considerable change in the product. The same is true of the hardener. However, when the two are mixed in about the proportions stated, the now potentially reactive varnish begins to show a considerable increase in viscosity within a very short period of time, say one week; and during warm weather, this increase in viscosity takes place so rapidly that the varnish will, within a month, turn into a solid, or into a mass which will not flow.

A 10 to 1 phenolic resin may be defined as the resulting resin when 10 mols. of the phenolic body are heated with 1 mol. of hexamethylenetetramin, or an equivalent in methylene groups. This corresponds with one active methylene group to approximately 1⅔ phenolic groups. The substances mentioned may be heated or boiled in an open vessel, or in any suitable apparatus, the boiling continuing until all, or a very high percentage, of the nitrogen present in the hexamethylenetetramin has escaped as ammonia. The invention is not confined to a 10 to 1 resin. Resins having proportions as high as 12 mols. of phenol to 1 mol. of hexamethylenetetramin and as low as 7 mols. to 1 mol. of hexamethylenetetramin have given satisfactory results. When the hardener is added, however, it is desirable that it shall furnish to the non-reactive phenolic condensation product varnish sufficient active methylene to unite with the soluble resin, including the free phenol therein. The theoretical proportions to produce the final insoluble product are 6 mols. of phenol to 1 mol. of hexamethylenetetramin. In practice, however, it is desirable to provide a slight excess of hexamethylenetetramin, that is, an amount somewhat above the theoretical proportion required. The purpose is to supply sufficient methylene to effect with certainty the conversion to the final or insoluble state, and to somewhat hasten the reaction. Accordingly, it is preferred that the final or potentially reactive varnish shall contain substantially one active methylene group to each slightly less than one phenolic group. Where the methylene body is hexamethylenetetramin, the final proportions are desirably one mol. of hexamethylenetetramin to approximately 5½ mols. of the phenolic body. As a matter of practice, if the initial resin is to be formed as a 7 to 1 resin, it is desirable to mix the materials, in the first instance, in about 10 to 1 proportions, boil the mixture to eliminate most of the nitrogen, and then eliminate a portion of the free phenol, either by continued boiling (either in an open vessel or in vacuo), or by blowing air through the hot fluid mass. It may be stated that proportions of about 7 mols. of phenol to 1 mol. of methylene in the stable initial fusible varnish results in a quick-hardening potentially reactive varnish when the hardener is added.

Usually, in impregnating materials, or applying coatings of the potentially reactive varnish, it is desirable to subject the coated object to heat treatment. In coating paper, for instance, the paper is passed through the varnish and then between heated rolls, which quickly effects, or largely effects, the conversion of the material to the final insoluble state. As an illustration of the preparation of a fusible phenolic resin, formed from cresol and adapted for use in this invention, the following may be stated.

Take 1080 pounds cresol, mix the same with 140 pounds hexamethylenetetramin, and heat the mixture for a period of say 24 to 48 hours. The preferred temperature may vary from 125° C. to 210° C.

In this process, the nitrogen, or most of the nitrogen contained in the hexamethylenetetramin, is eliminated in the form of ammonia, and there results a yellowish or brownish-colored fluid, which cools as a brittle resinous mass. The proportion stated above produces 10 to 1 resin; and, if desired, a portion of the free cresol may be blown from the mass, before the mass is allowed to cool. The resultant mass is still readily fusible and soluble, but is a stable mass, that is, is not in itself capable of reacting to a final product. This mass may be dissolved in a suitable solvent to form the initial stable phenolic product varnish suitable for use as described above in producing a potentially reactive varnish at such time as it is desired to use the varnish for industrial purposes.

The preferred solvent for the fusible varnish is denatured alcohol, although, as indicated above, any suitable solvent or mixture of solvents may be employed. It is preferred to use as a solvent for the active methylene body a solvent comprising a solution of water and another solvent which is miscible in water and is a solvent both for the methylene body and the initial phenolic resin. A good illustration is a solvent composed of 50 per cent. water and 50 per cent. alcohol.

In some instances, it may be desirable to use a larger percentage of solvent for the initial fusible resin than is stated in the example first given, and to add the methylene hardener, either in an undissolved state, or in a partially dissolved state. In any case, however, it is desirable to maintain the initial stable varnish and the hardener in separate containers until such time as the potentially reactive varnish is desired for industrial use, when the substances should be thoroughly mixed, or dissolved, together.

It will be understood that any suitable phenolic body may be employed, such as phenol, or its homologues, among which may be mentioned cresol and xylenol. These phenolic bodies may be used either separately or mixed together in any desired proportions. Any suitable phenolic body containing a reactive hydroxyl group and a re-active hydrogen on the ring, which reacts with an active methylene group, may be employed.

Any suitable active methylene body may be employed, such as hexamethylenetetramin and formaldehyde, or any compound containing an active methylene group, such as hexamethylenetetramin, paraform, metaldehyde, paraldehyde, acetaldehyde, etc. It may be added that the initial varnish, which, as has been explained, is normally incapable in itself of transformation, will change under prolonged heating at a high temperature, say through a period of many hours to several days, into a red, tough plastic film which is semi-insoluble and doubtless partially transformed. The nature of the action is obscure, and the material in this state has no present commercial value, so far as we are aware. The phenomenon is mentioned merely to emphasize the fact that the initial varnish which we provide is substantially incapable in itself of reacting to a final insoluble state. The appended claims are to be broadly enough construed to prevent any colorable evasion, the real purpose of the invention being to provide a phenolic varnish which will, practically speaking, remain in a "raw" state indefinitely when kept in a sealed container, and to add to this initial varnish a methylene hardener in order to produce a potentially reactive varnish, ready for application to some industrial purpose.

The preferred method described is thoroughly practicable and enables the soluble phenolic condensation product and the methylene hardener to be maintained under such conditions as to prevent chemical union of the methylene hardener and the soluble condensation product until such time as the varnish or lacquer is to be applied; and then the substances may be mixed or dissolved together or brought into mixed solution with great facility, thus providing a potentially re-active varnish, or lacquer. The operation of mixing or dissolving the substances together may be performed by unskilled labor, and without the use of special apparatus. As has been indicated, however, the invention is not limited to the preferred method herein described.

The foregoing detailed description has been given for clearness of understanding only, and no unnecessary limitation should be understood therefrom, but the appended claims should be construed as broadly as permissible, in view of the prior art.

What we regard as new and desire to secure by Letters Patent is—

1. The method of preparing a potentially reactive phenolic condensation product varnish, which comprises preparatorily manufacturing a solution of a soluble condensation product of a phenolic body and an active methylene body which contains such excess of the phenolic body as to be incapable of transformation to a final insoluble product; preparatorily dissolving an active methylene body in a solvent comprising a solution of water and another solvent which is miscible in water and is a solvent both for the methylene body and the fusible resin contained in the first mentioned solution; and then mixing the prepared solutions to form the potentially reactive varnish, 2. The method of preparing a potentially reactive phenolic condensation product varnish, which comprises preparatorily manufacturing a solution of a soluble condensation product of a phenolic body and an active methylene body which contains such excess of the phenolic body as to be incapable of transformation to a final insoluble product; maintaining said prepared solution in a container until the time for using the varnish; then introducing into the prepared initial varnish a sufficient amount of an active methylene substance to effect conversion to a final insoluble stage, thus providing a potentially reactive varnish ready for use.

3. The improvement in the art of preparing a phenolic condensation product varnish, which comprises: preparatorily manufacturing a solution of a soluble condensation product of a phenolic body and an active methylene body, which contains such excess of the phenolic body as to be incapable in itself of transformation to a final insoluble product; preparatorily manufacturing a solution of an active methylene body to serve as a hardener; maintaining said prepared solutions in separate containers until the time for using the varnish; then mixing the prepared substances to form a potentially reactive varnish.

4. The method of employing a phenolic condensation product varnish which consists in mixing, preparatory to the application of the varnish to the object which is to be treated, a methylene hardener with a preparatorily manufactured solution of a soluble condensation product of a phenolic body and an active methylene body which contains a large excess of the phenolic body, the methylene body of the hardener being taken in such quantity that the final product will represent the union of approximately one methylene group of the methylene body with slightly less than one phenolic group of the phenolic body.

5. The method of handling a phenolic condensation product varnish, which comprises: manufacturing a soluble condensation product of a phenolic body and an active methylene body which contains such excess of the phenolic body as to be incapable of passing to the final insoluble state; maintaining a solution of said soluble condensation product in a container until the time for use; and then mixing with said solution an active methylene substance in such quantity as to furnish sufficient methylene to combine with the fusible product and the free phenolic body thereof, thereby providing a potentially reactive varnish of desired fluidity.

6. The method of conserving and employing a phenolic condensation product varnish, which comprises: manufacturing a soluble condensation product of a phenolic body and an active methylene body, using such proportions as to furnish at least $1\frac{1}{4}$ phenolic groups to each methylene group; thinning the substance thus formed with a suitable solvent; maintaining a solution of said soluble condensation product in a container until the time for use; and then mixing with said solution a solution of an active methylene substance in such quantity as to furnish sufficient methylene to combine with the soluble condensation product and the free phenolic body thereof, thereby producing a potentially reactive varnish of desired fluidity.

7. The improvement in the art of preparing and employing a phenolic condensation product varnish which comprises: preparatorily manufacturing a soluble condensation product of a phenolic body and an active methylene body, which contains such excess of the phenolic body as to be incapable in itself of transformation to a final insoluble product; providing an active methylene body to serve as a hardener; maintaining said substances under conditions to prevent union until the time for using the varnish; then producing a mixed solution of said substances to form a potentially reactive varnish.

8. The improvement in the art of preparing and employing a phenolic condensation product varnish which comprises: preparatorily manufacturing a soluble condensation product of a phenolic body and an active methylene body, which contains such excess of the phenolic body as to be incapable in itself of transformation to a final insoluble product; producing a solution of said soluble condensation product; producing a solution of an active methylene body adapted to serve as a hardener; and mixing said solutions in such proportions as to provide a potentially re-active varnish containing approximately one methylene group for each phenolic group.

LAWRENCE V. REDMAN.
ARCHIE J. WEITH.
FRANK P. BROCK.